United States Patent
Takahashi et al.

(10) Patent No.: US 9,768,954 B2
(45) Date of Patent: Sep. 19, 2017

(54) QUANTUM KEY DISTRIBUTION DEVICE, QUANTUM KEY DISTRIBUTION SYSTEM, AND COMPUTER PROGRAM PRODUCT

(71) Applicant: Kabushiki Kaisha Toshiba, Minato-ku (JP)

(72) Inventors: Ririka Takahashi, Setagaya (JP); Yoshimichi Tanizawa, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/859,507

(22) Filed: Sep. 21, 2015

(65) Prior Publication Data
US 2016/0218868 A1 Jul. 28, 2016

(30) Foreign Application Priority Data

Jan. 23, 2015 (JP) .................................. 2015-011275

(51) Int. Cl.
H04K 1/00 (2006.01)
H04L 9/08 (2006.01)

(52) U.S. Cl.
CPC .......... *H04L 9/0858* (2013.01); *H04L 9/0816* (2013.01); *H04L 9/0838* (2013.01); *H04L 9/0852* (2013.01)

(58) Field of Classification Search
CPC ... H04L 9/0858; H04L 9/0816; H04L 9/0838; H04L 9/0852
See application file for complete search history.

(56) References Cited

U.S. PATENT DOCUMENTS

| | | | | |
|---|---|---|---|---|
| 8,693,691 | B2 * | 4/2014 | Jacobs | H04L 9/0852 380/278 |
| 2006/0059343 | A1 * | 3/2006 | Berzanskis | H04L 7/0008 713/171 |
| 2013/0315395 | A1 * | 11/2013 | Jacobs | H04L 9/0852 380/278 |
| 2014/0037087 | A1 * | 2/2014 | Tanaka | H04L 9/0838 380/44 |

FOREIGN PATENT DOCUMENTS

GB 2503045 12/2013

OTHER PUBLICATIONS

M. Lucamarini et al. "Efficient decoy-state quantum key distribution with quantified security", Optics Express, vol. 21, Issue 21, 2013, 16 pages.

* cited by examiner

*Primary Examiner* — Techane Gergiso
(74) *Attorney, Agent, or Firm* — Oblon, McClelland, Maier & Neustadt, L.L.P.

(57) ABSTRACT

According to an embodiment, a quantum key distribution device includes a quantum key distributor, a sifter, a corrector, an identifier, a classifier, a calculator, and a privacy amplifier. The quantum key distributor obtains a photon string from a photon string of two or more intensities of light pulses. The sifter obtains pulse information indicating the light pulse to which each bit of a shared bit string corresponds. The corrector corrects an error included in the shared bit string and generates a post-correction bit string. The identifier generates error position information. The classifier classifies each bit of the post-correction bit string. The calculator calculates the error rate for each light pulse and each base using the error position information. The privacy amplifier generates a cryptographic key from the post-correction bit string on the basis of the error rate.

8 Claims, 7 Drawing Sheets

|   | BASE | PULSE | TYPE OF DATA |
|---|---|---|---|
| 1 | × | SIGNAL | BIT COUNT |
| 2 | × | DECOY | BIT COUNT |
| 3 | × | VACUUM | BIT COUNT |
| 4 | × | SIGNAL | QBER |
| 5 | × | DECOY | QBER |
| 6 | × | VACUUM | QBER |
| 7 | + | SIGNAL | BIT COUNT |
| 8 | + | DECOY | BIT COUNT |
| 9 | + | VACUUM | BIT COUNT |
| 10 | + | SIGNAL | QBER |
| 11 | + | DECOY | QBER |
| 12 | + | VACUUM | QBER |

| BIT INFORMATION | 1 | 2 | 3 | 4 | 5 | 6 | 7 | 8 | 9 | 10 | 11 | 12 | |
|---|---|---|---|---|---|---|---|---|---|---|---|---|---|
| SIGNAL PULSE INFORMATION | 1 | 0 | 0 | 1 | 0 | 0 | 1 | 0 | 0 | 1 | 0 | 0 | |
| DECOY PULSE INFORMATION | 0 | 1 | 0 | 0 | 1 | 0 | 0 | 1 | 0 | 0 | 1 | 0 | ... |
| VACUUM PULSE INFORMATION | 0 | 0 | 1 | 0 | 0 | 1 | 0 | 0 | 1 | 0 | 0 | 1 | |
| BASE INFORMATION | 1 | 1 | 1 | 1 | 1 | 1 | 0 | 0 | 0 | 0 | 0 | 0 | |
| ERROR POSITION INFORMATION | 0 | 0 | 0 | 1 | 1 | 1 | 0 | 0 | 0 | 1 | 1 | 1 | |

QUANTUM KEY DISTRIBUTION DEVICE, QUANTUM KEY DISTRIBUTION SYSTEM, AND COMPUTER PROGRAM PRODUCT

CROSS-REFERENCE TO RELATED APPLICATIONS

This application is based upon and claims the benefit of priority from Japanese Patent Application No. 2015-011275, filed on Jan. 23, 2015; the entire contents of which are incorporated herein by reference.

FIELD

An embodiment described herein relates generally to a quantum key distribution device, a quantum key distribution system, and a computer program product.

BACKGROUND

A quantum key distribution system is configured with a transmitter, a receiver, and an optical fiber link that connects the transmitter and the receiver. The transmitter transmits photons to the receiver via the optical fiber link (a quantum communication channel) that serves as the communication channel for optical fiber. After that, the transmitter and the receiver exchange control information with each other, and share cryptographic keys. This technology is implemented using the technology generally referred to as quantum key distribution (QKD).

In order to share cryptographic keys between a transmitter and a receiver using quantum key distribution, it is necessary to perform key distillation in the transmitter as well as in the receiver. The key distillation includes sifting, error correction, and privacy amplification. As a result of performing the key distillation, the transmitter and the receiver share cryptographic keys. The shared cryptographic keys are used while performing cryptographic data communication between the transmitter and the receiver or between applications connected to the transmitter and the receiver. The amount of the shared cryptographic keys generated per unit time is called a secure key rate. Being able to use a number of cryptographic keys enables performing high-speed and safer cryptographic data communication. Hence, it can be said that, higher the secure key rate, the more enhanced is the performance of a quantum key distribution system.

In the quantum key distribution, the photons used for the purpose of sharing cryptographic keys possess quantum uncertainty which is one of the basic principles of quantum mechanics indicating that the photons undergo physical changes when tapped. Due to such a principle, if the photons including the information of the cryptographic key are transmitted from a transmitter and are tapped in the quantum communication channel by an eavesdropper, then the photons undergo physical changes thereby enabling the receiver that receives the photons to know that the photons have been tapped by an eavesdropper. At that time, the changes in the physical state of the photons appears in the form a quantum bit error rate (QBER) of the link between the transmitter and the receiver. When an eavesdropper attempts to tap the photons, the physical state of the photons undergoes physical changes thereby leading to an increase in the QBER. That enables the transmitter and the receiver to know about the presence of an eavesdropper.

Regarding such a quantum key distribution system, a system is proposed in which a decoy-state protocol and a protocol having a bias in the selection probabilities of the bases for observing polarization of photons are used, and highly-safe cryptographic keys from which the amount of information leaked to the eavesdropper is removed are generated in an efficient manner. The decoy-state protocol represents a protocol for generating a photon string using pulses for generating cryptographic key (hereinafter, called signal pulses) and laser pulses having a lower intensity than the signal pulses (hereinafter, called decoy pulses). Since the output photons follow the Poisson distribution, if generation of photons is done using only the signal pulses, then there is a probability of two or more photons being included in a single signal pulse, thereby allowing the eavesdropper to perform an attack of tapping a single photon (i.e., allow a photon number splitting attack). In order to deal with the attack, in the decoy-state protocol, decoy pulses are used that are different pulses than the signal pulses as described above. Moreover, there is also a method in which laser pulses having a lower intensity than the decoy pulses (hereinafter, called vacuum pulses) are used. The photons included in the decoy pulses and the vacuum pulses are not used for generating cryptographic keys. Besides, from among the signal pulses, the decoy pulses, and the vacuum pulses, it is not possible to distinguish the pulses in which the photons tapped by an eavesdropper were included. Meanwhile, the protocol having a bias in the selection probabilities of the bases represents a protocol in which the transmitter and the receiver do not randomly select one of two types of bases (for example, a rectilinear base and a diagonal base) for observing polarization of photons. Instead, the selection probabilities are set to have a bias, so that the bit loss attributed to sifting is reduced and the length of the eventually-obtained cryptographic key is increased. In the following explanation, of the two types of bases, one type is referred to as "+ base" (for example, the rectilinear base) and the other type is referred to as "x base" (for example, the diagonal base).

In such a quantum key distribution system, in order to obtain the length of the final cryptographic key, it is common practice to use the QBER for estimating the amount of information leaked to the eavesdropper. In the case of using the decoy-state protocol and the protocol having a bias in the selection probabilities of the bases while observing polarization of photons, it is necessary to calculate the QBER of bit data for each combination of the type of pulse and the type of base. That is, it is necessary to calculate the QBER of bit data corresponding to each combination of three types of pulses (the signal pulses, the decoy pulses, and the vacuum pulses) and two types of bases (the +base and the xbase). Hence, it is possible to think of a method in which bit data is classified for each combination of the type of pulse and the type of base, and error correction is performed for each piece of classified bit data to calculate the QBER.

However, if the error correction is performed after classifying the bit data for each combination of the type of pulse and the type of base, since the decoy pulses and the vacuum pulses have a low laser intensity, the decoy pulses and the vacuum pulses happen to have a high QBER of 20[%] and 50[%], respectively. Hence, errors in the bit data cannot be corrected, or it takes a long period of time for the error correction. That may lead to a decline in the generation efficiency of cryptographic keys.

DETAILED DESCRIPTION

According to an embodiment, a quantum key distribution device is connected to another quantum key distribution device by a quantum communication channel and a classical communication channel, and generates and shares an identical cryptographic key. The quantum key distribution device includes a quantum key distributor, a sifter, a corrector, an identifier, a classifier, a calculator, and a privacy amplifier. The quantum key distributor obtains a photon string by performing quantum key distribution via the quantum communication channel with respect to photons included in two or more intensities of light pulses, and obtains a photon bit string corresponding to the photon string on the basis of base information that is generated. The sifter generates a shared bit string from the photon bit string by performing sifting based on base information of the quantum key distributor and base information of the other quantum key distribution device, and obtains pulse information indicating the light pulse to which each bit of the shared bit string corresponds. The corrector performs error correction to correct an error included in the shared bit string and generates a post-correction bit string. The identifier generates error position information which enables identification of a bit in the post-correction bit string from which error was corrected during the error correction of the corrector. The classifier classifies, using the pulse information and the base information, the light pulse and a base to which each bit in the shared bit string corresponds. The calculator calculates an error rate for each of the light pulses and each of the bases classified by the classifier using the error position information. The privacy amplifier performs privacy amplification to compress the post-correction bit string on the basis of each of the error rates, and generates the cryptographic key.

An exemplary embodiment of a quantum key distribution device, a quantum key distribution system, and a computer program product are described below in detail with reference to the accompanying drawings. In the accompanying drawings, the same constituent elements are referred to by the same reference numerals. However, the drawings are only schematic in nature, and the specific configuration should be determined by taking into account the explanation given below.

Figure 1:
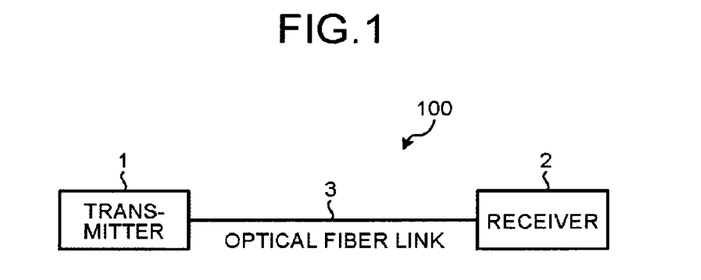
FIG. 1 is a diagram illustrating a quantum key distribution system.

FIG. 1 is a diagram illustrating an exemplary configuration of a quantum key distribution system. Thus, explained with reference to FIG. 1 is the configuration of a quantum key distribution system 100.

As illustrated in FIG. 1, the quantum key distribution system 100 includes a transmitter 1, a receiver 2, and an optical fiber link 3. Herein, although the following explanation is given about the quantum key distribution system 100 that includes a single transmitter 1 and a single receiver 2, it is also possible to have a configuration in which what is called a quantum access network (QAN), which has a single receiver 2 connected with a plurality of transmitters 1 via optical devices, is integrated with a quantum key distribution system. Alternatively, it is possible to have a quantum key distribution system in which the receiver 2 has a plurality of interfaces for optical fiber communication, and a plurality of transmitters 1 is connected to the receiver 2 via the interfaces. Moreover, in these cases, the transmitter 1 and the receiver 2 can have their roles reversed.

The transmitter 1 transmits, to the receiver 2 via the optical fiber link 3, a photon string that is made of single photons which are generated by a laser and which serve as the basis for generating cryptographic keys. Moreover, the transmitter 1 performs key distillation (described later) (i.e., sifting, error correction, and key compression) to the photon string that is transmitted; and generates a cryptographic key. Moreover, the transmitter 1 performs data communication with the receiver 2 via a classical communication channel, which is a communication channel other than a quantum communication channel implemented using the optical fiber link 3 and which is implemented using a communication cable such as an Ethernet (registered trademark) cable. The data communicated via the classical communication channel may include control data required in the key distillation or may include some other general-purpose data.

The receiver 2 receives, from the transmitter 1 via the optical fiber link 3, the photon string made of single photons that serve as the basis for generating cryptographic keys. Then, the receiver 2 performs key distillation (described later) (i.e., sifting, error correction, and key compression) to the photon string that is received; and generates a cryptographic key that is identical to the cryptographic key generated by the transmitter 1. That is, the transmitter 1 and the receiver 2 generate and share identical cryptographic keys. Moreover, the receiver 2 performs data communication with the transmitter 1 via the classical communication channel, which is a communication channel other than the quantum communication channel implemented using the optical fiber link 3 and which is implemented using a communication cable such as an Ethernet (registered trademark) cable.

The optical fiber link 3 is an optical fiber cable that serves as the quantum communication channel for transmitting single photons output by the transmitter 1. Meanwhile, although not illustrated in FIG. 1, the transmitter 1 and the receiver 2 are connected not only by the quantum communication channel in the form of the optical fiber link 3 but also by a communication cable (a classical communication channel) that is used in communicating regular digital data of 0 s and 1 s. A classical communication channel need not be a wired communication channel, and can be a wireless communication channel.

Herein, although the optical fiber link 3 serves as the quantum communication channel, and a communication cable (not illustrated) such as an Ethernet (registered trademark) cable serves as the classical communication channel; that is not the only possible case. Alternatively, for example, using the wavelength division multiplex (WDM) technology, the same optical fiber link 3 can be configured to have a photon communication channel for sending and receiving photons and an optical data communication channel for communicating optical data. In that case, in the optical fiber link 3, the photon communication channel serves as a quantum communication channel, while the optical data communication channel serves as a classical communication channel.

In the quantum key distribution system 100 including the transmitter 1 and the receiver 2, in case the photon string sent by the transmitter 1 is tapped by an eavesdropper from the optical fiber link 3, the photons undergo physical changes thereby enabling the receiver 2 that has received the photons to know that the photons have been tapped by an eavesdropper.

Meanwhile, in the case of collectively referring to the transmitter 1 and the receiver 2, the term "QKD devices" is used.

Figure 2:
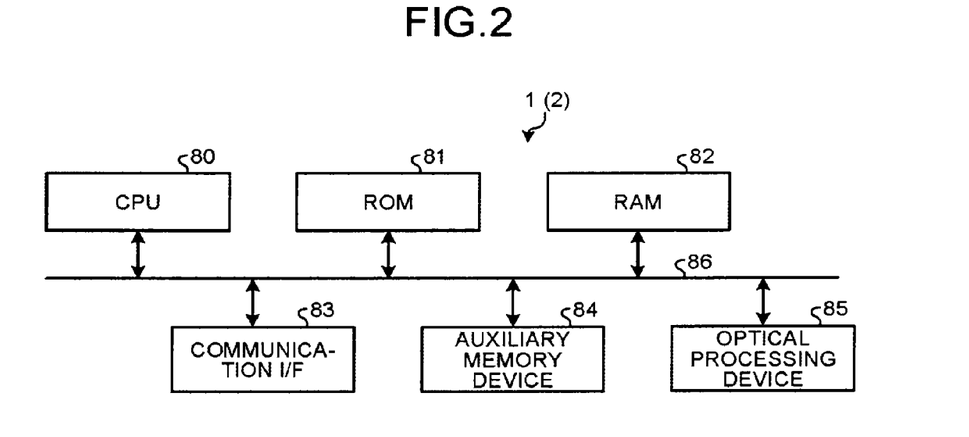
FIG. 2 is a diagram illustrating quantum key distribution (QKD) devices.

FIG. 2 is a diagram illustrating a hardware configuration of the QKD devices. With reference to FIG. 2, the explanation is given about a hardware configuration of the QKD devices (i.e., the transmitter 1 and the receiver 2).

As illustrated in FIG. 2, each QKD device includes a central processing unit (CPU) 80; a read only memory (ROM) 81; a random access memory (RAM) 82; a communication I/F 83; an auxiliary memory device 84; an optical processing device 85; and a bus 86 that connects the constituent elements to each other.

The CPU 80 is a processor that controls the operations of the entire QKD device. The ROM 81 is a nonvolatile memory device that is used in storing computer programs executed by the CPU 80 to control various functions. The RAM 82 is a volatile memory device that functions as the work memory of the CPU 80.

The communication I/F 83 is an interface that enables data communication via a classical communication channel of a network such as a local area network (LAN) or a wireless network. For example, the communication I/F 83 is an interface compatible to Ethernet (registered trademark) such as 10Base-T, 100Base-TX, or 1000Base-T.

The auxiliary memory device 84 is a nonvolatile memory device that is used in storing various computer programs executed by the CPU 80 and storing the data generated during the key distillation. The auxiliary memory device 84 is a memory device such as a hard disk drive (HDD), a solid state drive (SSD), a flash memory, or an optical disk in which information can be stored in an electrical, magnetic, or optical manner.

The optical processing device 85 is an optical device that transmits and receives photon strings. For example, the optical processing device 85 of the transmitter 1 transmits, to the optical processing device 85 of the receiver 2 via the quantum communication channel (i.e., via the optical fiber link 3 illustrated in FIG. 1), a photon string that is made of single photons which are generated to be in a polarization state based on base information generated to have a bias in the selection probabilities of the bases, as against a bit string (a photon bit string) generated using random numbers. In the photon string generated by the optical processing device 85 of the transmitter 1, each photon holds 1-bit information of either "0" or "1". Thus, the optical processing device 85 of the receiver 2 receives the photon string from the optical processing device 85 of the transmitter 1 via the quantum communication channel and, as described later, obtains a photon bit string by reading the received photon string on the basis of base information generated to have a bias in the selection probabilities of the bases.

Figure 3:
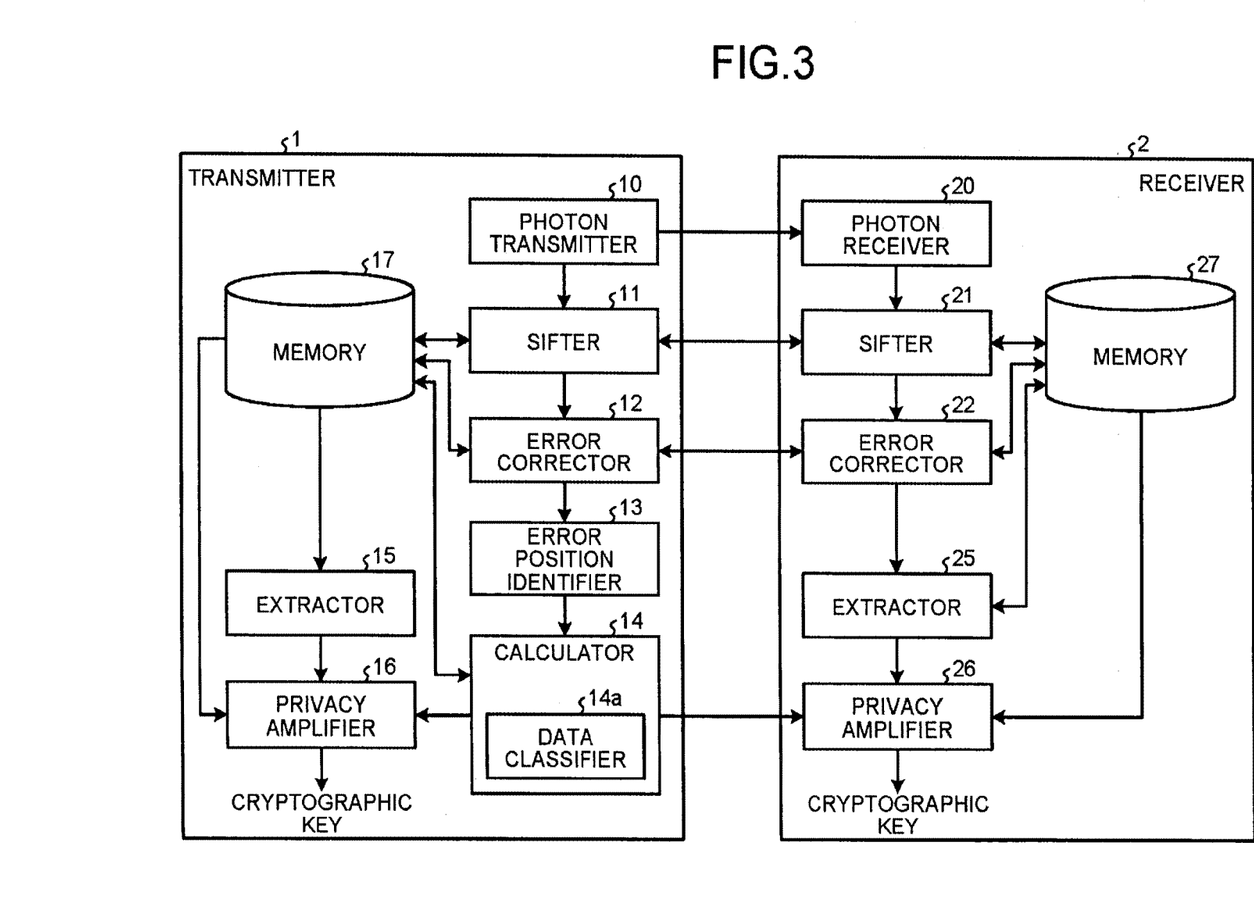
FIG. 3 is a diagram illustrating an example of functional blocks of the QKD devices.
Figure 4:
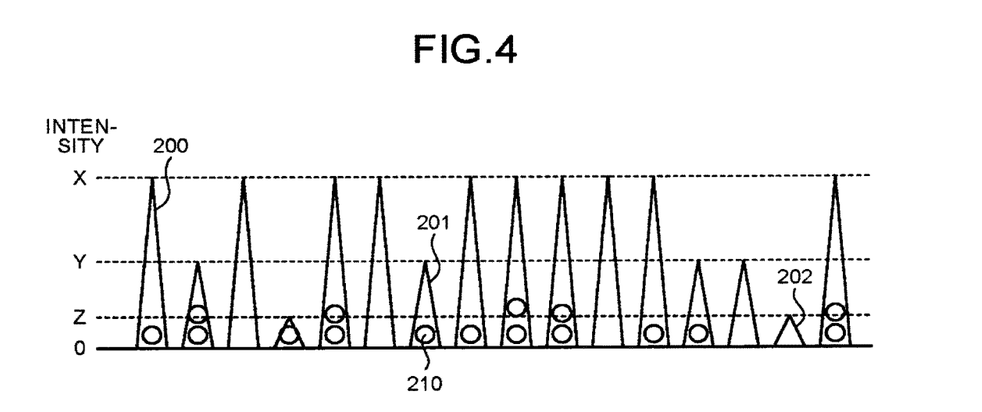
FIG. 4 is a schematic diagram for explaining about the types of pulses and about photons.
Figure 5:
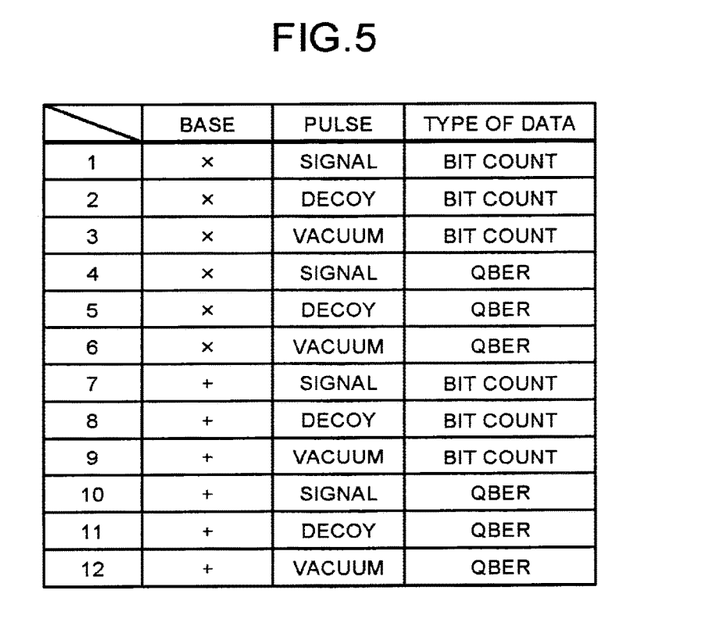
FIG. 5 is a diagram illustrating the types of data required in calculating the length of cryptographic keys.

FIG. 3 is a diagram illustrating an exemplary configuration of functional blocks of the QKD devices. FIG. 4 is a schematic diagram for explaining about the types of pulses and the photons included in the pulses. FIG. 5 is a diagram illustrating the types of data required in calculating the length of cryptographic keys. Thus, explained with reference to FIG. 3 is a configuration of the functional blocks of the transmitter 1 and the receiver 2. Moreover, explained with reference to FIG. 4 are the types of laser pulses generated by the transmitter 1 and the photons included in the pulses. Furthermore, explained with reference to FIG. 5 are the types of data that can be calculated by a calculator 14 (described later).

As illustrated in FIG. 3, the transmitter 1 includes a photon transmitter 10 (a quantum key distributor), a sifter 11, an error corrector 12 (a corrector), an error position identifier 13 (an identifier), the calculator 14, an extractor 15, a privacy amplifier 16, and a memory 17.

For example, as described later, the photon transmitter 10 is a functional unit configured to transmit, to a photon receiver 20 of the receiver 2 via the quantum communication channel, a photon string that is made of single photons which are generated to be in a polarization state based on base information generated to have a bias in the selection probabilities of the bases, as against a photon bit string generated using random numbers. The photon transmitter 10 is implemented using the optical processing device 85 illustrated in FIG. 2.

As illustrated in FIG. 4, the photon transmitter 10 generates photons by generating three types of pulses (light pulses) having different laser intensities (i.e., signal pulses 200, decoy pulses 201, and vacuum pulses 202). More particularly, the photon transmitter 10 generates the signal pulses 200 at a laser intensity X, generates the decoy pulses 201 at a laser intensity Y, and generates the vacuum pulses 202 at a laser intensity Z. Herein, the three types of pulses are randomly generated at predetermined probabilities. Moreover, the laser intensities satisfy the relationship of intensity X>intensity Y>intensity Z. The number of photons 210 included in such laser pulses is determined according to the Poisson distribution. Hence, there may be pulses in which the photons 210 are not included, and thereby may be pulses in which two or more photons 210 are included.

Due to the above-mentioned relationship among the pulse intensities, if an average of x number of photons is included in the signal pulses 200, if an average of y number of photons is included in the decoy pulses 201, and if an average of z number of photons is included in the vacuum pulses 202; then the number of average photons satisfies the relationship of x>y>z. The photons included in the signal pulses 200 assume the role of transmitting bit information that constitutes a cryptographic key. On the other hand, the photons included in the decoy pulses 201 and the vacuum pulses 202 are not used as bit information constituting a cryptographic key. As described above, the number of photons included in each type of pulses is determined according to the Poisson distribution. Besides, the number of average photons in each type of pulses satisfies the relationship of x>y>z. An eavesdropper cannot distinguish the pulses in which the tapped photons are included. Moreover, in case the photons are tapped by an eavesdropper, the pulse-by-pulse bit strings in the photon bit string have different error rates. Furthermore, the photon transmitter 10 recognizes whether the generated pulses are the signal pulses 200, the decoy pulses 201, or the vacuum pulses 202; as well as recognizes which photons in the generated photon string are included in which type of pulses.

Herein, although the photon transmitter 10 generates three types of pulses having different laser intensities (i.e., the signal pulses 200, the decoy pulses 201, and the vacuum pulses 202), that is not the only possible case. Alternatively, for example, the photon transmitter 10 can generate two types of pulses having different laser intensities (one of the types is equivalent to the signal pulses 200), or can generate four or more types of pulses having different laser intensities (at least one of the types is equivalent to the signal pulses 200).

The sifter 11 is a functional unit to receive, from a sifter 21 of the receiver 2 via the classical communication channel, base information generated by the photon receiver 20 of the receiver 2 to have a bias in the selection probabilities of the bases; and perform sifting that includes comparing the received base information with the base information generated by the photon transmitter 10, extracting the bits corresponding to the matching portion from the photon bit string, and generating a shared bit string. Meanwhile, the functions of the sifters 11 and 21 need not be included in both the transmitter 1 and the receiver 2. That is, alternatively, after the base information is sent to the sifter 11 from the sifter 21, the sifter 11 can compare two pieces of base information and send matching information indicating the matching portion to the sifter 21. Moreover, the sifting explained herein is only exemplary, and any other method can alternatively be implemented.

Moreover, the sifter 11 uses the recognition result obtained by the photon transmitter 10 about the type of pulse to which each bit of the photon bit string corresponds, and generates information indicating the type of pulse to which each bit of the shared bit string corresponds. More particularly, regarding the shared bit string, the sifter 11 generates signal pulse information indicating the positions of the bits corresponding to the signal pulses, generates decoy pulse information indicating the positions of the bits corresponding to the decoy pulses, and generates vacuum pulse information indicating the positions of the bits corresponding to the vacuum pulses. Then, the sifter 11 sends the signal pulse information, the decoy pulse information, and the vacuum pulse information to the sifter 21 of the receiver 2 via the classical communication channel, as well as stores that information in the memory 17. Meanwhile, in the case of referring to the signal pulses, the decoy pulses, and the vacuum pulses without distinguishing therebetween or in the case of collectively referring to the signal pulses, the decoy pulses, and the vacuum pulses; they are simply referred to as "pulses". In the case of referring to the signal pulse information, the decoy pulse information, and the vacuum pulse information without distinguishing therebetween or in the case of collectively referring to the signal pulse information, the decoy pulse information, and the vacuum pulse information; they are simply referred to as "pulse information". Moreover, the sifter 11 need not generate all of the signal pulse information, the decoy pulse information, and the vacuum pulse information. That is, the sifter 11 can generate at least two types of pulse information from among the three types of pulse information. That is because, if at least two types of pulse information are known from among the three types of pulse information, the remaining one type of pulse information can also be explicitly derived.

Furthermore, the sifter 11 compares the base information received from the sifter 21 of the receiver 2 via the classical communication channel and the base information generated by the photon transmitter 10; extracts the matching portion; and stores the extracted base information in the memory 17. This extracted base information serves as the information indicating which bits of the shared bit string correspond to + base and which bits of the shared bit string correspond to x base.

The error corrector 12 is a functional unit configured to perform error correction that includes exchanging control data (error correction (EC) information) with an error corrector 22 of the receiver 2 via the classical data communication channel; correcting the bit errors in the shared bit string; and generating a post-correction bit string. Then, the error corrector 12 stores the post-correction bit string in the memory 17. When the error correction is successful, the post-correction bit string generated by the error corrector 12 matches with a post-correction bit string generated by the error corrector 22 (described later) of the receiver 2 by correcting the shared bit string. Meanwhile, since the post-correction bit string is generated by correcting the bit errors in the shared bit string, the length of the post-correction bit string is identical to the length of the shared bit string.

Moreover, in order to correct the bit errors in the shared bit string and generate a post-correction bit string as described above, the error corrector 12 calculates the number of leaked bits on the basis of the amount of information of the EC information exchanged with the error corrector 22. Greater the number of leaked bits, greater is the probability of tapping and more is the probability of a greater amount of information being tapped. The error corrector 12 stores the number of leaked bits in the memory 17.

The error position identifier 13 is a functional unit configured to generate, during the error correction performed by the error corrector 12, error position information indicating the bits in the shared bit string in which an error is present, that is, information indicating the bits in the post-correction bit string that were subjected to error correction.

The calculator 14 is a functional unit configured to calculate, from the post-correction bit string generated by the error corrector 12, the quantum bit error rate (QBER) of the bit string corresponding to each type of pulse and each type of base. The calculator 14 includes a data classifier 14a (a classifier). More particularly, firstly, the calculator 14 reads the post-correction bit string, the pulse information, and the base information stored in the memory 17. Then, the data classifier 14a uses the pulse information and the base information, and classifies the type of pulse and the type of base to which each bit in the post-correction bit string corresponds. Subsequently, the calculator 14 uses the error position information generated by the error position identifier 13, and calculates the bit count (i.e., the number of bits) and the QBER (=number of bit errors/bit count) of the bit string corresponding to each type of pulse and each type of base classified by the data classifier 14a. That is, as illustrated in FIG. 5, the calculator 14 calculates 12 types of data as follows: the bit count and the QBER of the bit string corresponding to the x base and the signal pulses; the bit count and the QBER of the bit string corresponding to the x base and the decoy pulses; the bit count and the QBER of the bit string corresponding to the x base and the vacuum pulses; the bit count and the QBER of the bit string corresponding to the + base and the signal pulses; the bit count and the QBER of the bit string corresponding to the + base and the decoy pulses; and the bit count and the QBER of the bit string corresponding to the + base and the vacuum pulse. These pieces of data are used in calculating the length of cryptographic keys during the privacy amplification performed by the privacy amplifier 16. Then, the calculator 14 sends the 12 types of data to a privacy amplifier 26 of the receiver 2 via the classical communication channel.

Regarding the method for calculating the bit count and the QBER of the bit string corresponding to each type of pulse and each type of base in the shared bit string, generally it is possible to think of a method that includes dividing the shared bit string in advance into pulse-by-pulse bit strings and base-by-base bit strings; performing error correction with respect to each bit string; and calculating the bit count and the QBER in each bit string. However, the bit strings corresponding to the decoy pulses and the vacuum pulses generally have a higher QBER than the QBER of the bit strings corresponding to the signal pulses. Although also dependent on the settings of the photon transmitter 10, as an example, if the signal pulses have the QBER of about 4[%], the decoy pulses may have the QBER of about 20[%] and the vacuum pulses may have the QBER reaching to about 50[%]. Thus, the QBER is high for only the bit strings corresponding to the decoy pulses and the vacuum pulses. Hence, correction may not be achieved irrespective of performing error correction, or a long processing time is required even if correction succeeds. Hence, it is not an efficient method.

In contrast, in the embodiment, the shared bit string is not divided in advance into pulse-by-pulse bit strings and base-by-base bit strings. Instead, as described above, the error corrector 12 performs error correction with respect to the entire shared bit string. During the error correction performed by the error corrector 12, the error position identifier 13 generates error position information indicating the bits in the shared bit string in which an error is present. Then, the calculator 14 uses the error position information generated by the error position identifier 13, and calculates the bit count and the QBER of the bit string corresponding to each type of pulse and each type of base classified by the data classifier 14a (i.e., calculates the 12 types of data described above). As a result, it becomes possible to avoid a situation in which errors in the shared bit string cannot be corrected or in which a lot of time is spent for error correction. That enables achieving prevention of a decline in the generation efficiency of the final cryptographic key.

The extractor 15 is a functional unit configured to read, from the memory 17, the post-correction bit string generated by the error corrector 12; read, from the memory 17, the pulse information generated by the sifter 11; extract, from the post-correction bit string, the bit string corresponding to the signal pulses specified in the pulse information; and generate an extracted bit string. Of the post-correction bit string, the extracted bit string corresponding to the signal pulses is used as the bit string for generating a cryptographic key. Meanwhile, the extractor 15 need not read all of the signal pulse information, the decoy pulse information, and the vacuum pulse information as the pulse information. That is, at least the signal pulse information is read, and it becomes possible to know the positions of the bits of the shared bit string that correspond to the signal pulses. Hence, the extracted bit string can be generated.

The privacy amplifier 16 is a functional unit configured to read, from the memory 17, the number of leaked bits that are calculated by the error corrector 12; and perform privacy amplification that includes calculating the length of a final cryptographic key on the basis of the number of leaked bits and the 12 types of data calculated by the calculator 14, compressing the extracted bit string generated by the extractor 15, and generating a cryptographic key having the calculated length. When the privacy amplification is successful, the cryptographic key generated by the privacy amplifier 16 matches with the cryptographic key generated by the privacy amplifier 26 (described later) of the receiver 2. Thus, identical cryptographic keys are shared. These shared cryptographic keys are used while performing cryptographic data communication between the transmitter 1 and the receiver 2 or between applications connected to the transmitter 1 and the receiver 2.

The memory 17 is a functional unit configured to store therein the pulse information and the base information generated by the sifter 11, the post-correction bit string generated by the error corrector 12, and the number of leaked bits. The memory 17 is implemented using the auxiliary memory device 84 illustrated in FIG. 2.

Meanwhile, the sifter 11, the error corrector 12, the error position identifier 13, the calculator 14, the extractor 15, and the privacy amplifier 16 are implemented when the CPU 80 illustrated in FIG. 2 loads the computer programs from the auxiliary memory device 84 into the RAM 82 and executes them. However, the sifter 11, the error corrector 12, the error position identifier 13, the calculator 14, the extractor 15, and the privacy amplifier 16 are not all limited to be implemented by the execution of computer programs. Alternatively, at least some of the sifter 11, the error corrector 12, the error position identifier 13, the calculator 14, the extractor 15, and the privacy amplifier 16 can be implemented using hardware circuitry.

As illustrated in FIG. 3, the receiver 2 includes the photon receiver 20, the sifter 21, the error corrector 22, an extractor 25, the privacy amplifier 26, and a memory 27.

The photon receiver 20 is a functional unit configured to receive, from the photon transmitter 10 of the transmitter 1 via the quantum communication channel, a photon string and, as described later, obtain a photon bit string by reading the received photon string based on base information generated to have a bias in the selection probabilities of the bases. The photon receiver 20 is implemented using the optical processing device 85 illustrated in FIG. 2.

The sifter 21 is a functional unit configured to receive, from the sifter 11 of the transmitter 1 via the classical communication channel, base information generated by the photon transmitter 10 of the transmitter 1 to have a bias in the selection probabilities of the bases; and perform sifting that includes comparing the received base information with the base information generated by the photon receiver 20, extracting the bits corresponding to the matching portion from the photon bit string, and generating a shared bit string. Meanwhile, the functions of the sifters 11 and 21 need not be included in both the transmitter 1 and the receiver 2. That is, alternatively, after the base information is sent to the sifter 21 from the sifter 11, the sifter 21 can compare two pieces of base information and send matching information indicating the matching portion to the sifter 11. Moreover, the sifting explained herein is only exemplary, and any other method can alternatively be implemented.

Furthermore, the sifter 21 receives the signal pulse information, the decoy pulse information, and the vacuum pulse information generated by the sifter 11 via the classical communication channel; and stores that information in the memory 27. Meanwhile, the sifter 21 need not receive all of the signal pulse information, the decoy pulse information, and the vacuum pulse information. That is, the sifter 21 can receive at least two types of pulse information from among the three types of pulse information. That is because, if at least two types of pulse information are known from among the three types of pulse information, the remaining one type of pulse information can also be explicitly derived.

The error corrector 22 is a functional unit configured to perform error correction that includes exchanging control data (EC information) with the error corrector 12 of the transmitter 1 via the classical data communication channel; correcting the bit errors in the shared bit string; and generating a post-correction bit string. Then, the error corrector 22 stores the post-correction bit string in the memory 27. When the error correction is successful, the post-correction bit string generated by the error corrector 22 matches with the post-correction bit string generated by the error corrector 12 of the transmitter 1 by correcting the shared bit string. Meanwhile, since the post-correction bit string is generated by correcting the bit errors in the shared bit string, the length of the post-correction bit string is identical to the length of the shared bit string.

Moreover, in order to correct the bit errors in the shared bit string and generate a post-correction bit string as described above, the error corrector 22 calculates the number of leaked bits on the basis of the amount of information of the EC information exchanged with the error corrector 12. Then, the error corrector 22 stores the number of leaked bits in the memory 27.

The extractor 25 is a functional unit configured to read, from the memory 27, the post-correction bit string generated by the error corrector 22; read, from the memory 27, the pulse information generated by the sifter 21; extract, from the post-correction bit string, the bit string corresponding to the signal pulses specified in the pulse information; and generate an extracted bit string. Meanwhile, the pulse information read by the extractor 25 need not include all of the signal pulse information, the decoy pulse information, and the vacuum pulse information. That is, at least the signal pulse information is read, and it becomes possible to know the positions of the bits of the shared bit string that correspond to the signal pulses. Hence, the extracted bit string can be generated.

The privacy amplifier 26 is a functional unit configured to read, from the memory 27, the number of leaked bits that are calculated by the error corrector 22; and perform privacy amplification that includes calculating the length of a final cryptographic key on the basis of the number of leaked bits and the 12 types of data received from the calculator 14 via the classical communication channel, compressing the extracted bit string generated by the extractor 25, and generating a cryptographic key having the calculated length.

The memory 27 is a functional unit configured to store therein the pulse information received by the sifter 21, the post-correction bit string generated by the error corrector 22, and the number of leaked bits. The memory 27 is implemented using the auxiliary memory device 84 illustrated in FIG. 2.

Meanwhile, the sifter 21, the error corrector 22, the extractor 25, and the privacy amplifier 26 are implemented when the CPU 80 illustrated in FIG. 2 loads the computer programs from the auxiliary memory device 84 into the RAM 82 and executes them. However, the sifter 21, the error corrector 22, the extractor 25, and the privacy amplifier 26 are not all limited to be implemented by the execution of computer programs. Alternatively, at least some of the sifter 21, the error corrector 22, the extractor 25, and the privacy amplifier 26 can be implemented using hardware circuitry.

Meanwhile, the functional block configuration of the transmitter 1 and the receiver 2 illustrated in FIG. 3 is meant to illustrate the functions in a conceptual manner. That is, the configuration is not limited to the functional block configuration illustrated in FIG. 3. Alternatively, for example, a plurality of independent functional units illustrated in FIG. 3 can be combined as a single functional unit. On the other hand, the function of a single functional unit illustrated in FIG. 3 can be divided into a plurality of functions and can be implemented using a plurality of functional units.

Figure 6:
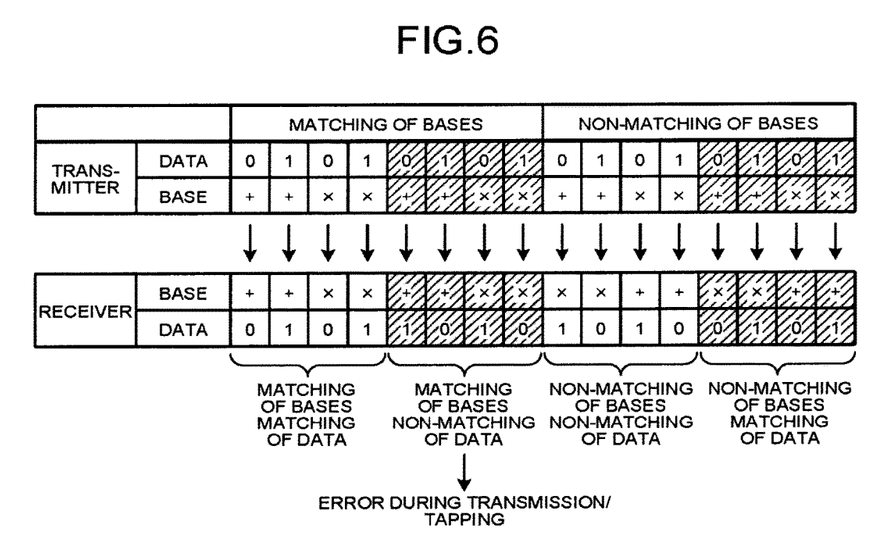
FIG. 6 is a diagram for explaining the relationship between the types of bases and the errors in bit data.

FIG. 6 is a diagram for explaining the relationship between the types of bases and the errors in bit data. Thus, explained with reference to FIG. 6 is the relationship between the types of bases and the errors in bit data.

As described above, when comparison is performed between the base information generated by the photon transmitter 10 to have a bias in the selection probabilities of the bases and the base information generated by the photon receiver 20 to have a bias in the selection probabilities of the bases, the pieces of base information may or may not match with each other. Consider the case in which the pieces of bias information match. In that case, when the single photons generated by the photon transmitter 10 are normally transmitted to the photon receiver 20 via the quantum communication channel, the photon receiver 20 can correctly read the polarization state of the photons on the basis of the identical type of base, and the bit information that is obtained matches with the bit information of the photon string transmitted from the photon transmitter 10.

On the other hand, consider the case in which the bases do not match. In that case, when the single photons generated by the photon transmitter 10 are transmitted to the photon receiver 20 via the quantum communication channel, the photon receiver 20 cannot correctly read the polarization state of the photons. In that case, according to the principle of quantum mechanics, the bit information obtained by the photon receiver 20 from the photon string that is transmitted by the photon transmitter 10 may or may not match in hindsight with the bit information of the photon string transmitted from the photon transmitter 10. However, as a result of performing the sifting, the bit information corresponding to the non-matching bases is removed.

Also in the case in which the bases match, if the photon string transmitted from the photon transmitter 10 is affected by the noise included in the quantum communication channel or is tapped in the quantum communication channel by an eavesdropper, then the photons undergo physical changes according to quantum uncertainty thereby leading to a situation in which the bit information obtained by the photon receiver 20 by reading the photon string based on its own base may not match with the bit information of the photon string transmitted from the photon transmitter 10. As a result, even in the shared bit string obtained after performing the sifting, the mismatch appears in the form of bit errors.

Figure 7A:
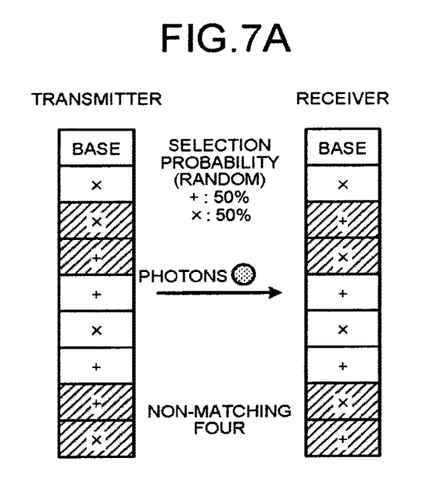
FIGS. 7A and 7B are diagrams for explaining the selection probabilities of the bases.
Figure 7B:
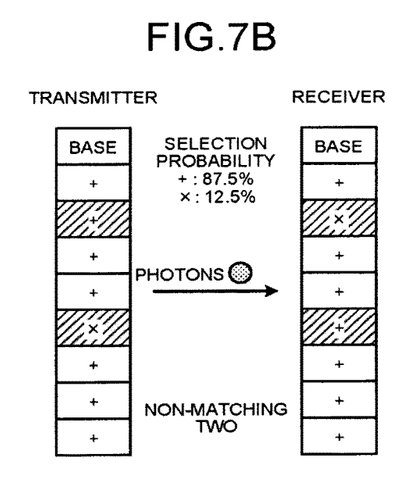

FIGS. 7A and 7B are diagrams for explaining the selection probabilities of the bases. Thus, the explanation about the bias in the selection probabilities of the bases is given with reference to FIGS. 7A and 7B.

In the photon transmitter 10 and the photon receiver 20, if δ represents the probability of selection of one type of base, then (1-δ) represents the probability of selection of the other type of base. Hence, the probability at which the bases match is expressed as given below in Equation (1).

$$\delta \cdot \delta + (1-\delta)(1-\delta) = 2\delta^2 - 2\delta + 1 \qquad (1)$$

For example, as illustrated in FIG. 7A, in the photon transmitter 10 of the transmitter 1 and the photon receiver 20 of the receiver 2, if the selection probability of each of the two bases is random in nature, that is, equal to half; then the probability at which the base generated by the photon transmitter 10 matches with the base generated by the photon receiver 20 also becomes equal to half. That is, statistically, the length of the shared bit strings generated by the sifters 11 and 21 becomes equal to half of the length of the photon bit string. Thus, statistically, the length of the shared bit strings cannot be increased to be greater than half of the length of the photon bit string.

In that regard, as described above, if the selection probability of each of the two bases is set to half, that is, if δ=½ is satisfied; then the probability at which the base generated by the photon transmitter 10 matches with the base generated by the photon receiver 20 becomes equal to half (50[%]) as given below in Equation (2). That is same as the description given earlier.

$$2\delta^2-2\delta+1=2(½)^2-2(½)+1=½ \quad (2)$$

For example, as illustrated in FIG. 7B, if the probability of selecting the + base is set to δ=⅞ and if the probability of selecting the x base is set to (1−δ)=⅛; then the probability at which the base generated by the photon transmitter 10 matches with the base generated by the photon receiver 20 becomes equal to 25/32 (87.5[%]) as given below in Equation (3).

$$2\delta^2-2\delta+1=2(⅞)^2-2(⅞)+1=25/32 \quad (3)$$

As a result, statistically, the length of the shared bit strings generated by the sifters 11 and 21 becomes equal to 25/32 of the length of the photon bit string, and thus becomes greater than the length calculated in Equation (2). In this way, as a result of having a bias in the selection probabilities of the bases, there is a decrease in the number of bits removed from the photon bit string during the sifting, thereby making it possible to increase the length of the final cryptographic key.

Figure 8:
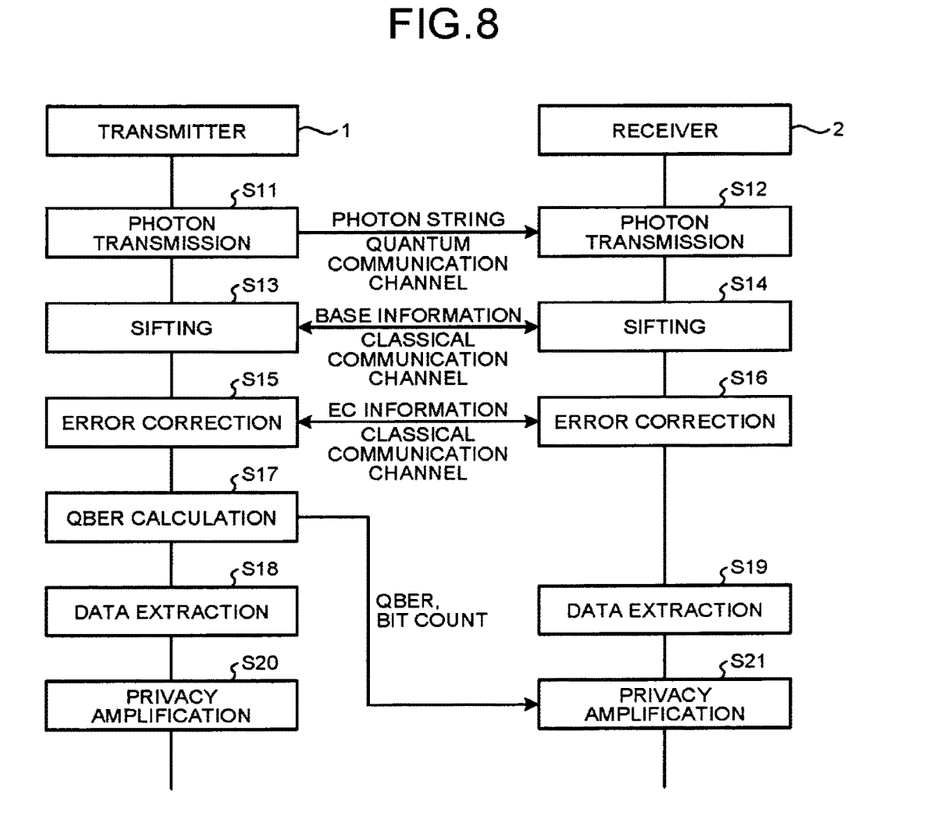
FIG. 8 is a sequence diagram illustrating an example of the operation for generating cryptographic keys in the QKD devices.
Figure 9:
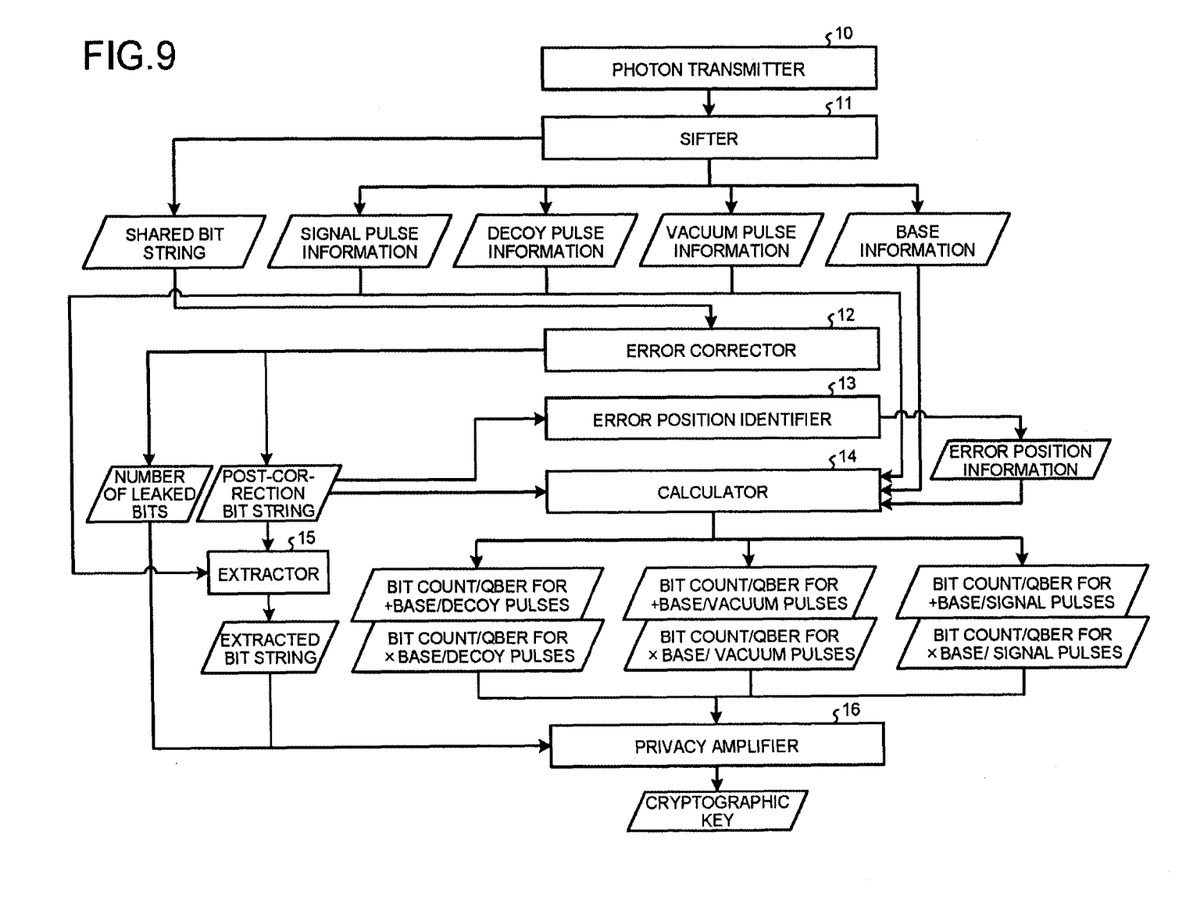
FIG. 9 is a flowchart for explaining the details regarding the flow of data during the operation for generating cryptographic keys.
Figure 10:
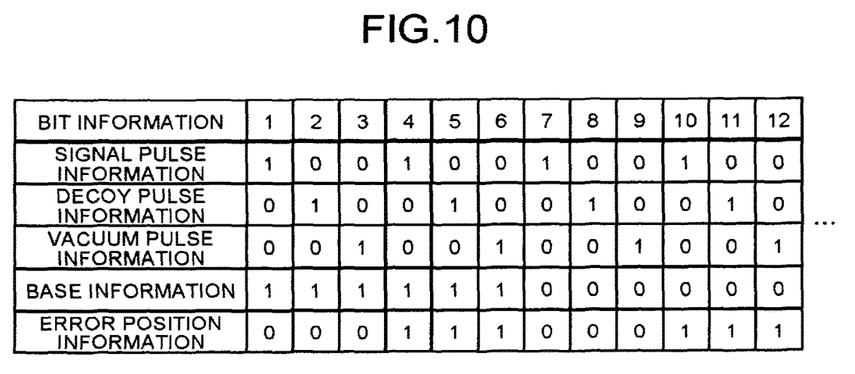
FIG. 10 is a diagram for explaining a method for calculating the quantum bit error rate (QBER) based on various types of data.

FIG. 8 is a sequence diagram illustrating an example of the operation for generating cryptographic keys in the QKD devices. FIG. 9 is a flowchart for explaining the details regarding the flow of data during the operation for generating cryptographic keys. FIG. 10 is a diagram for explaining a method for calculating the QBER based on various types of data. Thus, explained with reference to FIGS. 8 to 10 is a flow of operations performed to generate cryptographic keys.

Step S11

For example, the photon transmitter 10 transmits, to the photon receiver 20 of the receiver 2 via the quantum communication channel, a photon string that is made of single photons which are generated to be in a polarization state based on base information generated to have a bias in the selection probabilities of the bases, as against a photon bit string generated using random numbers. At that time, as illustrated in FIG. 4, the photon transmitter 10 generates photons by generating three types of pulses having different laser intensities (i.e., the signal pulses 200, the decoy pulses 201, and the vacuum pulses 202).

Step S12

The photon receiver 20 receives the photon string from the photon transmitter 10 of the transmitter 1 via the quantum communication channel, and obtains a photon bit string by reading the received photon string on the basis of base information generated to have a bias in the selection probabilities of the bases.

Step S13

The sifter 11 receives, from the sifter 21 of the receiver 2 via the classical communication channel, base information generated by the photon receiver 20 of the receiver 2 to have a bias in the selection probabilities of the bases; and performs sifting that includes comparing the received base information with the base information generated by the photon transmitter 10, extracting the bits corresponding to the matching portion from the photon bit string, and generating a shared bit string as illustrated in FIG. 9.

Moreover, the sifter 11 generates, from the recognition result obtained by the photon transmitter 10 about the type of pulse to which each bit of the photon bit string corresponds, information indicating the type of pulse to which each bit of the shared bit string corresponds. More particularly, as illustrated in FIG. 9, regarding the shared bit string, the sifter 11 generates signal pulse information indicating the positions of the bits corresponding to the signal pulses, generates decoy pulse information indicating the positions of the bits corresponding to the decoy pulses, and generates vacuum pulse information indicating the positions of the bits corresponding to the vacuum pulses. Then, the sifter 11 sends the signal pulse information, the decoy pulse information, and the vacuum pulse information to the sifter 21 of the receiver 2 via the classical communication channel, as well as stores that information in the memory 17.

Furthermore, as illustrated in FIG. 9, the sifter 11 compares the base information received from the sifter 21 of the receiver 2 via the classical communication channel and the base information generated by the photon transmitter 10; extracts the matching portion; and stores the extracted base information in the memory 17.

Step S14

The sifter 21 receives, from the sifter 11 of the transmitter 1 via the classical communication channel, base information generated by the photon transmitter 10 of the transmitter 1 to have a bias in the selection probabilities of the bases; and performs sifting that includes comparing the received base information with the base information generated by the photon receiver 20, extracting the bits corresponding to the matching portion from the photon bit string, and generating a shared bit string.

Moreover, the sifter 21 receives the signal pulse information, the decoy pulse information, and the vacuum pulse information generated by the sifter 11 via the classical communication channel, and stores that information in the memory 27.

Step S15

The error corrector 12 performs error correction that includes exchanging control data (EC information) with the error corrector 22 of the receiver 2 via the classical data communication channel; correcting the bit errors in the shared bit string generated by the sifter 11; and generating a post-correction bit string as illustrated in FIG. 9. The error corrector 12 then stores the post-correction bit string in the memory 17.

Moreover, as illustrated in FIG. 9, in order to correct the bit errors in the shared bit string and generate a post-correction bit string, the error corrector 12 calculates the number of leaked bits on the basis of the amount of information of the EC information exchanged with the error corrector 22. The error corrector 12 then stores the number of leaked bits in the memory 17.

The error position identifier 13 generates, during the error correction performed by the error corrector 12, error position information indicating the bits in the shared bit string in which an error is present, that is, information indicating the bits in the post-correction bit string that were subjected to error correction as illustrated in FIG. 9.

Step S16

The error corrector 22 performs error correction that includes exchanging control data (EC information) with the error corrector 12 of the transmitter 1 via the classical data communication channel; correcting the bit errors in the shared bit string generated by the sifter 21; and generating a post-correction bit string. The error corrector 22 then stores the post-correction bit string in the memory 27.

Moreover, in order to correct the bit errors in the shared bit string and generate a post-correction bit string as described above, the error corrector 22 calculates the number of leaked bits on the basis of the amount of information of the EC information exchanged with the error corrector 12. The error corrector 22 then stores the number of leaked bits in the memory 27.

Step S17

The calculator 14 calculates, from the post-correction bit string generated by the error corrector 12, the QBER of the bit string corresponding to each type of pulse and each type of base. More particularly, firstly, the calculator 14 reads the post-correction bit string, the pulse information, and the base information stored in the memory 17. Then, the data classifier 14a uses the pulse information and the base information, and classifies the type of pulse and the type of base to which each bit in the post-correction bit string corresponds. Subsequently, the calculator 14 uses the error position information generated by the error position identifier 13, and calculates the bit count (i.e., the number of bits) and the QBER (=number of bit errors/bit count) of the bit string corresponding to each type of pulse and each type of base classified by the data classifier 14a. That is, as illustrated in FIG. 5, the calculator 14 calculates 12 types of data as follows: the bit count and the QBER of the bit string corresponding to the x base and the signal pulses; the bit count and the QBER of the bit string corresponding to the x base and the decoy pulses; the bit count and the QBER of the bit string corresponding to the x base and the vacuum pulses; the bit count and the QBER of the bit string corresponding to the + base and the signal pulses; the bit count and the QBER of the bit string corresponding to the + base and the decoy pulses; and the bit count and the QBER of the bit string corresponding to the + base and the vacuum pulse. Then, the calculator 14 sends the 12 types of data to the privacy amplifier 26 of the receiver 2 via the classical communication channel.

Meanwhile, regarding a specific method by which the calculator 14 calculates the bit count and the QBER of the bit string corresponding to each pulse and each base, for example, the following method can be implemented. As illustrated in FIG. 10, in the post-correction bit string, the type of pulse to which the bit at each position corresponds can be distinguished using the pulse information (the signal pulse information, the decoy pulse information, and the vacuum pulse information). Moreover, in the post-correction bit string, the type of base to which the bit at each position corresponds can be distinguished using the base information. For example, with reference to FIG. 10, it is assumed that "1" represents the + base and "0" represents the x base. In this way, in the post-correction bit string, using the pulse information and the base information to distinguish the type of pulse and the type of base to which the bit at each position corresponds is equivalent to the classification performed by the data classifier 14a. Moreover, in the post-correction bit string, the positions of the bits that were subjected to error correction can be distinguished using the error position information. For example, with reference to FIG. 10, in the error position information, "1" represents the bits that were subjected to error correction and "0" represents the bits that were not subjected to error correction.

If each bit in the post-correction bit string is distinguished in the manner described above, for example, the bit at the fourth bit position can be distinguished to be corresponding to the signal pulses and the + base, and further can be distinguished to have been subjected to error correction. For example, as illustrated in FIG. 10, if attention is paid to the bit string having the bits from the first bit position to the 12-th bit position in the shared bit string, the bit string corresponding to the x base and the signal pulses is calculated to have the bit count of "2" and the QBER of ½ (50[%]). Similarly, the bit string corresponding to the x base and the decoy pulse is calculated to have the bit count of "2" and the QBER of ½ (50[%]). Moreover, the bit string corresponding to the x base and the vacuum pulse is calculated to have the bit count of "2" and the QBER of ½ (50[%]). Furthermore, the bit string corresponding to the + base and the signal pulse is calculated to have the bit count of "2" and the QBER of ½ (50[%]). Moreover, the bit string corresponding to the + base and the decoy pulse is calculated to have the bit count of "2" and the QBER of ½ (50[%]). Furthermore, the bit string corresponding to the + base and the vacuum pulse is calculated to have the bit count of "2" and the QBER of ½ (50[%]).

Step S18

The extractor 15 reads, from the memory 17, the post-correction bit string generated by the error corrector 12; reads, from the memory 17, the pulse information generated by the sifter 11; extracts, from the post-correction bit string, the bit string corresponding to the signal pulses indicated by the pulse information; and generates an extracted bit string.

Step S19

The extractor 25 reads, from the memory 27, the post-correction bit string generated by the error corrector 22; reads, from the memory 27, the pulse information generated by the sifter 21; extracts, from the post-correction bit string, the bit string corresponding to the signal pulses indicated by the pulse information; and generates an extracted bit string.

Step S20

The privacy amplifier 16 reads, from the memory 17, the number of leaked bits that are calculated by the error corrector 12; and performs privacy amplification that includes calculating the length of a final cryptographic key on the basis of the number of leaked bits and based on the 12 types of data calculated by the calculator 14, compressing the extracted bit string generated by the extractor 15, and generating a cryptographic key having the calculated length.

Step S21

The privacy amplifier 26 reads, from the memory 27, the number of leaked bits that are calculated by the error corrector 22; and performs privacy amplification that includes calculating the length of a final cryptographic key on the basis of the number of leaked bits and based on the 12 types of data received from the calculator 14 via the classical communication channel, compressing the extracted bit string generated by the extractor 25, and generating a cryptographic key having the calculated length.

As a result of the operations described above, identical cryptographic keys are generated in the transmitter 1 and the receiver 2. The cryptographic keys generated as a result of the operations described above are used as one time pads that are not used more than once. Hence, every time the operations are performed, different cryptographic keys are generated in a repeated manner. Meanwhile, the steps described above can be performed in parallel. For example, in parallel with the error correction performed at Steps S15 and S16, the sifting performed at Steps S13 and S14 can be performed with respect to a different bit string.

Of the data generated by various functional units illustrated in FIG. 3, some of the data is stored in the memories 17 and 27. However, all of that data need not always be stored. Alternatively, the data can be directly sent to the functional units responsible for the respective next processes. For example, as described above, the error corrector 12 stores the generated post-correction bit string in the memory 17; and the calculator 14 and the extractor 15 read the post-correction bit string from the memory 17. Instead, the error corrector 12 can directly send the post-correction bit string to the calculator 14 and the extractor 15 without storing it in the memory 17. Conversely, of the data generated by various functional units illustrated in FIG. 3, some of the data is directly sent to the functional units responsible for the respective next processes without storing the data in the memories 17 and 27. Alternatively, the data can be once stored in the memories 17 and 27. For example, as described above, the sifter 11 sends the generated shared bit string directly to the error corrector 12. Alternatively, the sifter 11 can once store the generated shared bit string in the memory 17. In this case, the error corrector 12 can read the shared bit string from the memory 17, and perform the error correction.

As described above, in the embodiment, the shared bit string is not divided in advance into pulse-by-pulse bit strings and base-by-base bit strings. Instead, the error corrector 12 performs error correction with respect to the entire shared bit string. During the error correction performed by the error corrector 12, the error position identifier 13 generates error position information that indicates the bits in the shared bit string in which an error is present. Then, the calculator 14 uses the error position information generated by the error position identifier 13, and calculates the bit count and the QBER of the bit string corresponding to each type of pulse and each type of base classified by the data classifier 14a (i.e., calculates the 12 types of data described above). As a result, it becomes possible to avoid a situation in which errors in the shared bit string cannot be corrected or in which a lot of time is spent for error correction. That enables achieving prevention of a decline in the generation efficiency of the final cryptographic key. Besides, calculation of the QBER can be done without having to perform communication for the purpose of matching and comparing the bit strings during the generation of cryptographic keys between the transmitter 1 and the receiver 2.

Meanwhile, with reference to FIG. 3, the transmitter 1 includes the error position identifier 13 and the calculator 14; while the receiver 2 does not include those functional units. However, that is not the only possible configuration. Alternatively, for example, the receiver 2 can include the functional units equivalent to the error position identifier 13 and the calculator 14. In that case, the calculator 14 of the receiver 2 can use the pulse information generated in the transmitter 1, and can generate the bit count and the QBER corresponding to each type of pulse and each type of base. Still alternatively, the transmitter 1 as well as the receiver 2 can include the functional units equivalent to the error position identifier 13 and the calculator 14. In that case, the calculator 14 of the receiver 2 independently calculates the 12 types of data. Hence, as described above, the calculator 14 of the transmitter 1 need not send the 12 types of data to the privacy amplifier 26 of the receiver 2.

Moreover, the privacy amplifier 16 of the transmitter 1 as well as the privacy amplifier 26 of the receiver 2 calculates the length of the cryptographic keys on the basis of the number of leaked bits and the 12 types of data. However, that is not the only possible case. Alternatively, either the privacy amplifier 16 or the privacy amplifier 26 can calculate the length of cryptographic keys and send the length to the other privacy amplifier via the classical communication channel. Then, the other privacy amplifier can make use of the received length of cryptographic keys and perform the privacy amplification.

Meanwhile, the computer programs executed in the QKD devices according to the embodiment are stored in advance in, for example, the ROM 81.

Alternatively, the computer programs executed in the QKD devices according to the embodiment can be recorded as installable or executable files in a computer-readable recording medium such as a compact disk read only memory (CD-ROM), a flexible disk (ED), a compact disk recordable (CD-R), or a digital versatile disk (DVD); and can be provided as a computer program product.

Still alternatively, the computer programs executed in the QKD devices according to the embodiment can be saved as downloadable files on a computer connected to the Internet or can be made available for distribution through a network such as the Internet.

The computer programs executed in the QKD devices according to the embodiment can make a computer function as the constituent elements of the QKD devices (i.e., the sifter 11, the error corrector 12, the error position identifier 13, the calculator 14, the extractor 15, and the privacy amplifier 16; or the sifter 21, the error corrector 22, the extractor 25, and the privacy amplifier 26). In such a computer, the CPU 80 can read the computer programs from a computer-readable memory medium, load them in a main memory device, and execute them.

While a certain embodiment has been described, the embodiment has been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A quantum key distribution device that is connected to another quantum key distribution device by a quantum communication channel and a classical communication channel and that generates and shares an identical cryptographic key, the quantum key distribution device comprising:

a quantum key distributor to obtain a photon string by performing quantum key distribution via the quantum communication channel with respect to photons included in two or more intensities of light pulses, and obtain a photon bit string corresponding to the photon string on the basis of base information that is generated;

a sifter to generate a shared bit string from the photon bit string by performing sifting based on base information of the quantum key distributor and base information of the other quantum key distribution device, and obtain pulse information indicating the light pulse to which each bit of the shared bit string corresponds;

a corrector to perform error correction to correct an error included in the shared bit string and generate a post-correction bit string;

an identifier to generate error position information which enables identification of a bit in the post-correction bit string from which error was corrected during the error correction of the corrector;

a classifier to classify, using the pulse information and the base information, the light pulse and a base to which each bit in the post-correction bit string corresponds;

a calculator to calculate an error rate for each of the light pulses and each of the bases classified by the classifier using the error position information; and a privacy amplifier to perform privacy amplification to compress the post-correction bit string on the basis of each of the error rates, and generate the cryptographic key.

2. The device according to claim 1, wherein
the quantum key distributor
generates each of the light pulses,
generates the photon string from photons included in each of the light pulses, and
transmits the photon string to the other quantum key distribution device via the quantum key communication channel, and
the sifter generates the pulse information according to types of the light pulses generated by the quantum key distributor.

3. The device according to claim 1, wherein
the quantum key distributor receives the photon string from the other quantum key distribution device via the quantum key communication channel, and generates the photon bit string by reading information included in the photon string on the basis of the base information that is generated, and
the sifter receives the pulse information from the other quantum key distribution device via the classical communication channel.

4. The device according to claim 1, further comprising an extractor to extract, from the post-correction bit string, a bit string indicated by the pulse information as an extracted bit string for purpose of forming the cryptographic key, wherein
the privacy amplifier generates the cryptographic key by performing the privacy amplification with respect to the extracted bit string.

5. The device according to claim 1, wherein
the corrector calculates number of leaked bits on the basis of control information that is exchanged with the other quantum key distribution device via the classical communication channel during the error correction, and
the privacy amplifier performs the privacy amplification by further using the number of leaked bits.

6. The device according to claim 1, wherein
the calculator further calculates, using the error position information, a bit count of a bit string in the post-correction bit string corresponding to each of the light pulses and each of the bases classified by the classifier, and
the privacy amplifier generates the cryptographic key by performing the privacy amplification on the basis of the error rate and the bit count.

7. A quantum key distribution system comprising:
a plurality of quantum key distribution devices that are connected by a quantum communication channel and a classical communication channel and that generates and shares identical cryptographic keys, wherein
at least one of the plurality quantum key distribution devices includes
a quantum key distributor to obtain a photon string by performing quantum key distribution via the quantum communication channel with respect to photons included in two or more intensities of light pulses, and obtains a photon bit string corresponding to the photon string on the basis of base information that is generated;
a sifter to generate a shared bit string from the photon bit string by performing sifting based on base information of the quantum key distributor and base information of another quantum key distribution device, and obtain pulse information indicating the light pulse to which each bit of the shared bit string corresponds;
a corrector to perform error correction to correct an error included in the shared bit string and generate a post-correction bit string;
an identifier to generate error position information which enables identification of a bit in the post-correction bit string from which error was corrected during the error correction of the corrector;
a classifier to classify, using the pulse information and the base information, the light pulse and a base to which each bit in the post-correction bit string corresponds;
a calculator to calculate an error rate for each of the light pulses and each of the bases classified by the classifier using the error position information; and
a privacy amplifier to perform privacy amplification to compress the post-correction bit string on the basis of each of the error rates, and generate the cryptographic key.

8. A computer program product comprising a non-transitory computer readable medium including programmed instructions, wherein the programmed instructions cause a computer
that is connected to another quantum key distribution device by a quantum communication channel and a classical communication channel and that generates and shares an identical cryptographic key, and
that includes a quantum key distributor to obtain a photon string by performing quantum key distribution via the quantum communication channel with respect to photons included in two or more intensities of light pulses, and obtains a photon bit string corresponding to the photon string on the basis of the generated base information,
to function as:
a sifter to generate a shared bit string from the photon bit string by performing sifting based on base information of the quantum key distributor and base information of the other quantum key distribution device, and obtain pulse information indicating the light pulse to which each bit of the shared bit string corresponds;
a corrector to perform error correction to correct an error included in the shared bit string and generate a post-correction bit string;
an identifier to generate error position information which enables identification of a bit in the post-correction bit string from which error was corrected during the error correction of the corrector;
a classifier to classify, using the pulse information and the base information, the light pulse and a base to which each bit in the post-correction bit string corresponds;
a calculator to calculate an error rate for each of the light pulses and each of the bases classified by the classifier using the error position information; and
a privacy amplifier to perform privacy amplification to compress the post-correction bit string on the basis of each of the error rates, and generate the cryptographic key.

* * * * *